Figure 1:
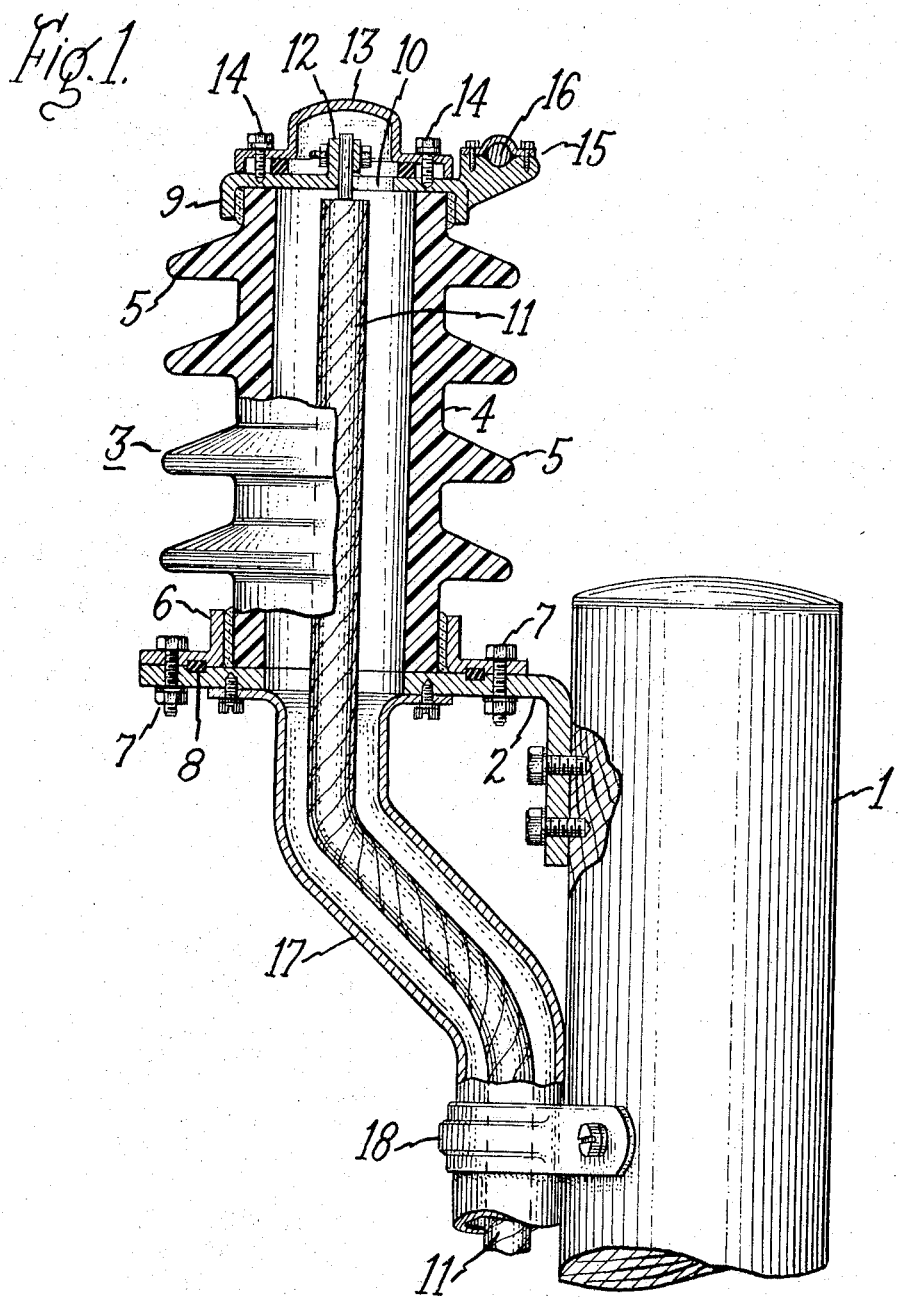

Inventor,
Howard A. Frey,
by Gilbert P. Tarleton
His Attorney.

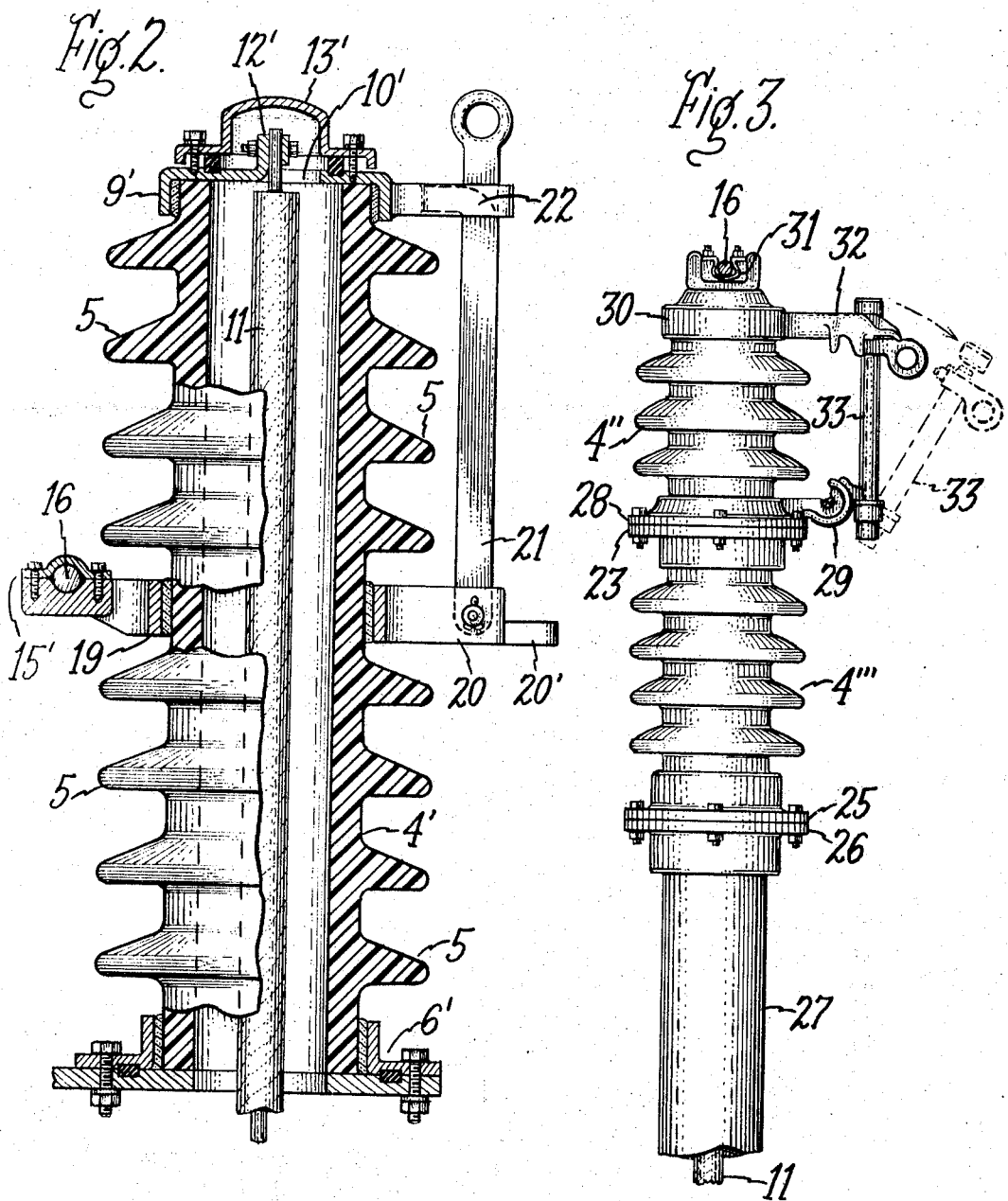

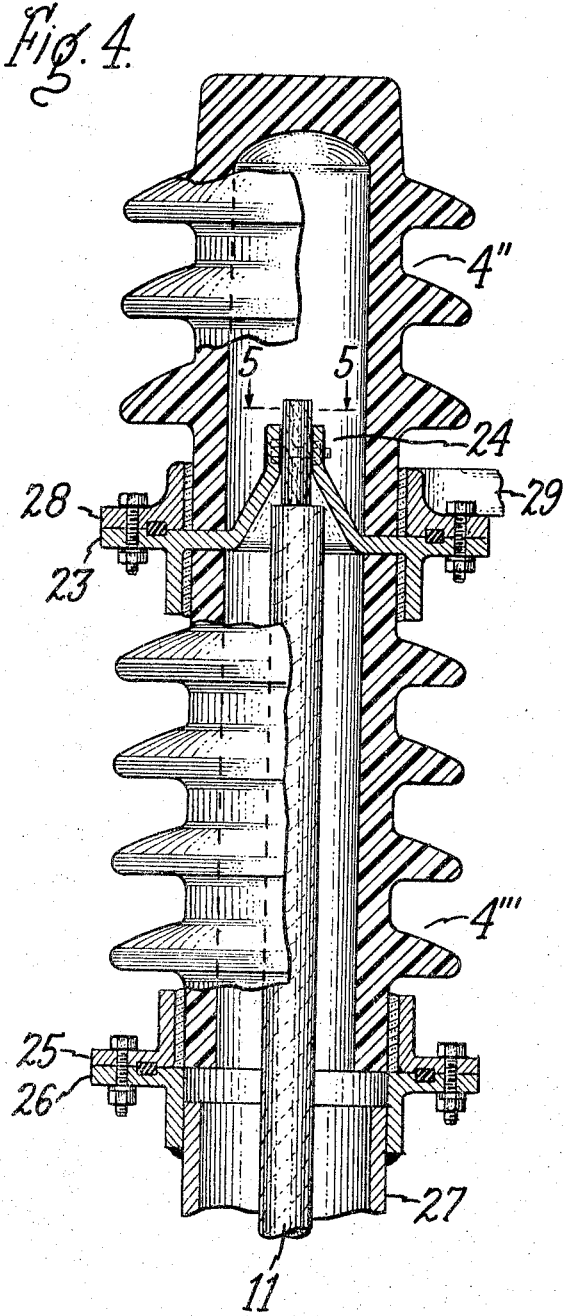
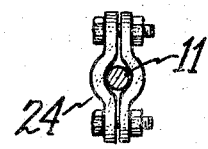

United States Patent Office 3,315,046
Patented Apr. 18, 1967

3,315,046
COMBINATION LINE INSULATOR AND CABLE POTHEAD
Howard A. Frey, Towson, Md., assignor to General Electric Company, a corporation of New York
Filed Sept. 29, 1965, Ser. No. 491,105
2 Claims. (Cl. 200—48)

This invention relates to electrical insulators and more particularly to a combination line insulator, cable pothead and circuit interrupter.

The current national consciousness of aesthetics and trend toward beautification has extended to cleaning up or improving the appearance of electrical distribution systems and circuits, if not actually putting them out of sight, by burying them in the ground. An intermediate approach is to carry only the relatively high voltage small conductor primary feeders above ground on poles and tap such feeders by cables which run down the poles, either inside or outside, to voltage step down distribution transformers mounted in the base of the pole, or on pads on landscaped ground, or in vaults in the ground. The more numerous, larger size, low voltage secondary conductors, which normally are the most unsightly part of the distribution system would be underground and hence out of sight.

Such an approach to improving the appearance of distribution systems would ordinarily require an insulator for insulatingly supporting the feeder conductor from the pole, a separate pothead for insulating the cable termination where it taps into the feeder conductor and, usually, a separate circuit interrupter electrically between the feeder and the cable.

In accordance with this invention there is provided a novel combination insulator and pothead wherein the same insulator supports and insulates both the feeder and the cable termination and can also provide the insulation for a circuit interrupter electrically between the feeder and the cable termination.

An object of the invention is to provide a novel combination line conductor insulator and cable termination pothead.

Another object of the invention is to provide a novel combination line conductor insulator, cable termination pothead and circuit interrupter therebetween.

The invention will be better understood from the following description taken in connection with the accompanying drawings and its scope will be pointed out in the appended claims.

In the drawings,
FIG. 1 is an elevation view, principally in longitudinal mid-section of an embodiment of the invention,
FIG. 2 is a similar view of a modification provided with a circuit interrupter in the form of a disconnect switch,
FIG. 3 is an elevation view of another modification provided with a fuse type circuit interrupter,
FIG. 4 is an enlarged longitudinal mid-sectional view of the embodiment shown in elevation in FIG. 3, and
FIG. 5 is a detail view of the cable clamp portion of FIG. 4.

Referring now to the drawings and more particularly to FIG. 1, there is shown therein the top of a line pole 1 on which by means of a bracket 2 a combined line conductor insulator and cable termination pothead 3 is mounted. The principal part or element of device 3 is an elongated hollow insulator 4 which may be made of any suitable material such as porcelain or organic non-creep tracking insulating material such as a cured polymeric resin filled with a substantial amount of hydrated alumina. As shown, the insulator 4 is preferably provided with integral sheds or rainhoods 5. Attached, as by cement, to the lower end of the insulator 4 is a mounting flange 6 which may be attached as by bolts 7 to the mounting bracket 2. Preferably a gasket such as an O-ring 8 is provided between the mating surfaces of the bracket 2 and the mounting flange 6. Attached, as by cement, to the upper end of the insulator 4 is a metallic cap 9 which has a central opening 10 through which the conductor of an insulated cable 11 may be passed. Adjacent the hole 10 is a suitable clamp 12 for clamping the cable conductor. The opening 10 and clamp 12 may be enclosed by a removable cover or dome 13 of metallic or plastic material, attached to the cap 9 by screws or bolts 14. Eccentrically mounted on the cap 9 is a line conductor receiving saddle and clamp assembly 15 in which a line conductor 16 is shown positioned. The cable 11 extends through the insulator 4 and runs down the side of the pole 1 preferably enclosed in a protective conduit 17 whose mouth is attached to an opening in the bracket 2 and which may be fastened as by straps 18 to the side of the pole 1.

In the modification shown in FIG. 2, an insulator 4' generally similar to insulator 4 of FIG. 1 but somewhat longer is provided with a bottom mounting flange 6', top cap 9', hole 10', cable clamp 12' and dome 13' as in FIG. 1, but the line or feeder conductor clamp 15' is attached near the middle of the insulator 4' by a surrounding hardware bracket 19 carrying a pivot support 20 for a switch blade 21 which engages a fixed contact 22 formed integrally with the cap 9'. In this figure, the lower part of the insulator 4' provides the necessary insulation between the hardware 15', 19 and 20 which are at the potential of the line conductor 16 and the mounting flange 6' which is normally at ground potential. When the switch blade 21 is swung open so as to interrupt the circuit between the line conductor 16 and the cable 11 the upper part or half of the insulator 4' will serve to provide the necessary switch insulation or insulation between the disconnected line conductor 16 and the cable 11. The member 20 is provided with an integral stop 20' for preventing the switch blade 21 from swinging below the horizontal position so as to maintain the full arc strike distance of the length of the lower part of the insulator 4'.

In the modification shown in FIGS. 3 and 4, the insulator 4' of FIG. 2 is divided into two parts 4" and 4''' whose functions are reversed relative to the upper and lower halves of the insulator 4'. Thus the insulator 4''' functions as a pothead and has a top flange or cap 23 having a central opening and a cable clamp 24 shown in greater detail in FIG. 5, which is a sectional view taken on line 5—5 of FIG. 4. The insulator 4''' has a bottom metallic mounting flange 25 fitted on a corresponding flange 26 on the top of a hollow pole 27 through which the cable 11 is passed. The insulator part 4" has a mounting flange 28 mating with and attached to the flange of the cap 23 and also has a hinge 29 for an open type dropout fuse cutout 33. At the top of the insulator 4" is a metallic cap 30 carrying a saddle clamp 31 for line conductor 16 and also has a latch 32 for the fuse cutout. Between the parts 29 and 32 is a circuit interrupter in the form of a fuse cutout 33.

In FIGS. 3 and 4 the normal working insulation is that provided by the insulator 4''' but when the fuse blows or is removed for disconnecting the circuit then both the insulators 4" and 4''' in series serve to provide the insulation between the line 16 and the grounded pole 27.

While there have been shown and described particular embodiments of the invention, it will be obvious to those skilled in the art that changes and modifications may be made without departing from the invention, and therefore it is intended by the appended claims to cover all such changes and modifications as fall within the true spirit and scope of the invention.

What I claim as new and desire to secure by Letters Patent of the United States is:

1. A combined line conductor insulator and cable tap pothead comprising, in combination, a unitary elongated hollow combination post-type and pothead insulator, mounting hardware attached to one end of said insulator and cable clamping hardware attached to the other end of said insulator for receiving and clamping the end of a cable which extends through said insulator from its mounting end to its clamping end, external line conductor receiving clamping hardware means mounted on said insulator intermediate its ends, and integral circuit interrupting means electrically connecting said cable clamping and line conductor clamping means together.

2. A combined line conductor insulator and cable tap pothead for mounting to the top of a distribution line pole, comprising, in combination, a unitary elongated hollow combination post-type and pothead insulator, mounting hardware attached to the lower end of said insulator for mounting it in a vertical position at the top of a line pole, cable clamping hardware attached to the upper end of said insulator for receiving and clamping the end of a cable which extends vertically through said insulator from its mounting end to its clamping end, external line conductor receiving and clamping hardware means mounted on said insulator at the middle thereof, and an integral disconnect switch electrically connecting said cable clamping means and said line conductor clamping means together.

References Cited by the Examiner

UNITED STATES PATENTS

| | | | |
|---|---|---|---|
| 1,707,479 | 4/1929 | Jacobs | 200—48 |
| 1,922,336 | 8/1933 | Steinmayer | 174—75 |
| 2,285,529 | 6/1942 | Papp | 174—75 |
| 3,187,175 | 6/1965 | Lang | 174—38 X |

LARAMIE E. ASKIN, *Primary Examiner.*